United States Patent [19]

Griffis et al.

[11] Patent Number: 4,511,924

[45] Date of Patent: Apr. 16, 1985

[54] FREQUENCY TRANSLATION PHASE-LOCKED LOOP FOR SEPARATE OR INTERCARRIER TYPE TELEVISION SOUND DETECTION

[75] Inventors: Patrick D. Griffis; Abraham E. Rindal, both of Indianapolis, Ind.

[73] Assignee: RCA Corporation, Princeton, N.J.

[21] Appl. No.: 437,833

[22] Filed: Oct. 29, 1982

[51] Int. Cl.³ .............................................. H04N 5/62
[52] U.S. Cl. .................................................. 358/197
[58] Field of Search ................. 358/197, 198, 188, 23, 358/25; 455/130, 204, 206, 208

[56] References Cited

FOREIGN PATENT DOCUMENTS 2089608A 6/1982 United Kingdom .

OTHER PUBLICATIONS

Phaselock Techniques, by Floyd M. Gardner, published by John Wiley and Sons, Inc., 1966, Chapter 8-4.
United States Patent Application Ser. No. 412,902, entitled "Television Sound Detection System Using a Frequency Translation Phase-Locked Loop", filed Aug. 30, 1982, in the name of Abraham E. Rindal and assigned to RCA Corporation.
Concurrently filed United States Patent Application entitled "Sound Signal and Impulse Noise Detector for Television Receivers", filed in the name of Abraham E. Rindal and assigned to RCA Corporation.
Block Diagram of 1450 Television Demodulator, manufactured by Tektronix, Inc., and published Jul. 1979.
Electrical Patents Index Profile Booklet, W3, Week E25/E28, published Sep. 15, 1982, includes on p. 40 a Figure and Abstract for Great Britain Patent Application No. 2,089,608, published Jun. 23, 1982.

Primary Examiner—Tommy P. Chin
Attorney, Agent, or Firm—Eugene M. Whitacre; Peter M. Emanuel; Lawrence C. Edelman

[57] ABSTRACT

A frequency translation phase-locked loop (PLL) is provided for detecting the audio information from a received television signal. The PLL includes a switching arrangement which, in a first position causes the loop to process the IF picture and sound carriers for detecting the audio information in an intercarrier type of detection method and, in a second position causes the loop to process the IF sound carrier for detecting the audio information without the use of the received picture carrier, in a "separate" (split-sound) type of audio detection method.

5 Claims, 2 Drawing Figures

FREQUENCY TRANSLATION PHASE-LOCKED LOOP FOR SEPARATE OR INTERCARRIER TYPE TELEVISION SOUND DETECTION

BACKGROUND OF THE INVENTION

The present invention relates to television sound signal processing and, in particular, to a frequency translation phase-locked loop (PLL) for detecting the audio information.

Multichannel audio for stereo and bi-lingual broadcasting involves the use of one or more audio subcarriers, which subcarriers increase the television audio signal bandwidth from 15 kHz to approximately 90 kHz or more. As a result an audio buzz which is produced in the sound signal processing channel tends to be more severe.

Audio buzz, which may be defined as the result of picture-related modulation which is transferred to the audio signal, has always been present to some degree in television signal processing circuitry, but has been kept to within tolerable limits by various circuit techniques.

In the early days of television, "separate" or "split-sound" detection was used for detecting the audio information. The picture and sound signals were processed in separate channels which followed the tuner circuitry. Such separate processing prevented any significant interaction within the receiver of the picture and sound carriers and thus substantially eliminated receiver generated audio buzz. Unfortunately, any frequency variations of the tuner local oscillator due to drift or automatic fine tuning (AFT) were imparted to the intermediate frequency (IF) sound carrier as well as the IF picture carrier and were detected as spurious interference (buzz) by the audio frequency modulation (FM) detector. Additionally, since the passband of the sound channel is much narrower than the passband of the picture channel, the receiver had to be tuned for best sound, not best picture.

Modern day television receivers almost universally use the intercarrier method of sound signal processing. In the conventional intercarrier method, the picture and sound carriers are processed after the tuner in a common IF channel. This IF channel includes a particular IF bandpass response which (1) attentuates the sound carrier about 20 dB more than the picture carrier and (2) locates the picture carrier 6 dB down on the high frequency slope of the IF passband. Thereafter, the greater amplitude picture carrier is processed in the video channel for detecting the video information and, for recovering the audio information, the two IF carriers are mixed to form an intercarrier sound signal having a frequency corresponding to the difference of the carrier IF frequencies. E.g., for the NTSC system a 45.75 MHz picture carrier is mixed with a 41.25 MHz sound carrier for producing a 4.5 MHz intercarrier sound signal. The intercarrier sound signal is then separately demodulated (discriminated) for detecting the audio information.

The intercarrier detection method is particularly advantageous due to the fact that common mode FM of the sound and picture carriers caused, e.g., by tuner local oscillator variations in the receiver itself and in television accessories to which the receiver may be coupled, such as a cable TV converter, is cancelled by the IF signal mixing when the intercarrier sound signal is developed. However, the conventional intercarrier method is not buzz free. Although the above-noted intercarrier IF passband response is necessary for proper detection of the picture carrier; its use tends to increase audio buzz compared to the separate picture and sound channel method by: (1) significantly attenuating the sound carrier and thus reducing the signal-to-noise ratio of the audio signal, and (2) causing unequal IF picture carrier sideband attenuation which imparts an incidential carrier phase modulation (ICPM) to the picture carrier, commonly referred to as "Nyquist ICPM", which distorts the sound signal during intercarrier mixing. Additionally, in the conventional intercarrier detection system a high degree of modulation or overmodulation of the picture carrier (which is commonly caused by local affiliate stations insertion of picture overlays) can interrupt the picture carrier signal and cause audio buzz at the video line and field rates (i.e., 15,734 Hz and 60 Hz in the NTSC system).

The audio buzz produced by the intercarrier system, although present, can be tolerated in monophonic audio television receivers due to the relatively narrow passband of the sound channel in such receivers. Unfortunately, with the increased audio bandwidth of multichannel audio, the audio buzz is also increased and may no longer be within tolerable limits.

An audio detection system for processing television signals which may include a multichannel audio signal, in which the audio buzz can be reduced to within acceptable levels, is described in U.S. Pat. Application Ser. No. 412,902, U.S. Pat. No. 4,470,071, entitled, "TELEVISION SOUND DETECTION SYSTEM USING A FREQUENCY TRANSLATION PHASE-LOCKED LOOP" filed Aug. 30, 1982, in the name of Abraham E. Rindal and assigned, like the present application, to RCA Corporation. In that system audio information is detected by a frequency translation phase-locked loop (PLL) including a frequency translation signal mixer and a phase detector responsive to the IF picture and sound carriers, respectively, provided at the output of the tuner. More specifically, a picture bandpass filter and amplifier selects the picture carrier from the output of the tuner and applies it to an input of the signal mixer. A voltage controllable oscillator (VCO) applies a VCO signal to a second input of the mixer, and a frequency translated signal at the output of the mixer is applied to a first input of the phase detector. A sound bandpass filter and amplifier also coupled to the output of the tuner, selects the sound carrier and applies it to a second input of the phase detector. A lowpass filter coupled to the output of the phase detector which supplies a control signal to the VCO also provides the detected audio information. Since the frequency translation PLL processes the IF sound carrier without having it first pass through the above-noted intercarrier IF passband, picture-related audio buzz is significantly reduced from that which results from the conventional type of intercarrier detector. Furthermore, since the picture carrier is used to generate the frequency translation signal, which is used to detect the audio information, any common mode FM of the picture and sound carriers is cancelled by the phase detector. Consequently, in this respect, the frequency translation PLL can be considered a type of intercarrier detector.

Although common mode FM of the picture and sound carriers is cancelled in either the conventional type of intercarrier system or the PLL type of intercarrier system, if only the picture carrier had incidental FM, the very act of mixing the picture and sound carriers together would impress that incidental FM on the sound carrier and distort the FM encoded audio information. A particularly troublesome area in the television signal processing system wherein incidental FM may be impressed on the picture carrier, is at the television broadcast transmitter. Here, changes in the video and RF signal levels can result in changes in circuit parameters of the various parts of the transmitter and impart varying amounts of ICPM to the picture carrier. Additionally, the amount of ICPM of the picture carrier can vary depending upon the correctness of the transmitter adjustments and can therefore vary from station to station.

When there exists a high ICPM of the picture carrier only, it would be desirable to detect the sound signal without using the transmitted picture carrier, i.e., by using a "separate" type of audio detector. However, where there is substantial common mode FM, it would be desirable to use an intercarrier type of audio detector. Great Britain Patent Application No. 2089608 of Sony Corp., published June 23, 1982, describes a television receiver which includes two separate audio detectors, a conventional intercarrier type and a "separate" type, both coupled to the tuner output and operating continuously for detecting the audio signal. A switch coupled to the output of each audio detector controls which output will be used for deriving the audio information. In this system, two separate sound signal detection systems are required. This increases the complexity of the sound detection system, its power consumption and its cost.

SUMMARY OF THE INVENTION

In accordance with the principles of the present invention a frequency translation phase-locked loop is used for detecting the audio information from a received IF sound carrier. The PLL includes a switching arrangement which, in a first position causes the loop to process the IF picture and sound carriers for detecting the audio information in an intercarrier type of detection method and, in a second position causes the loop to process the IF sound carrier for detecting the audio information without the use of the received picture carrier in a separate type of audio detection method.

DESCRIPTION OF THE PREFERRED EMBODIMENTS

Figure 1:
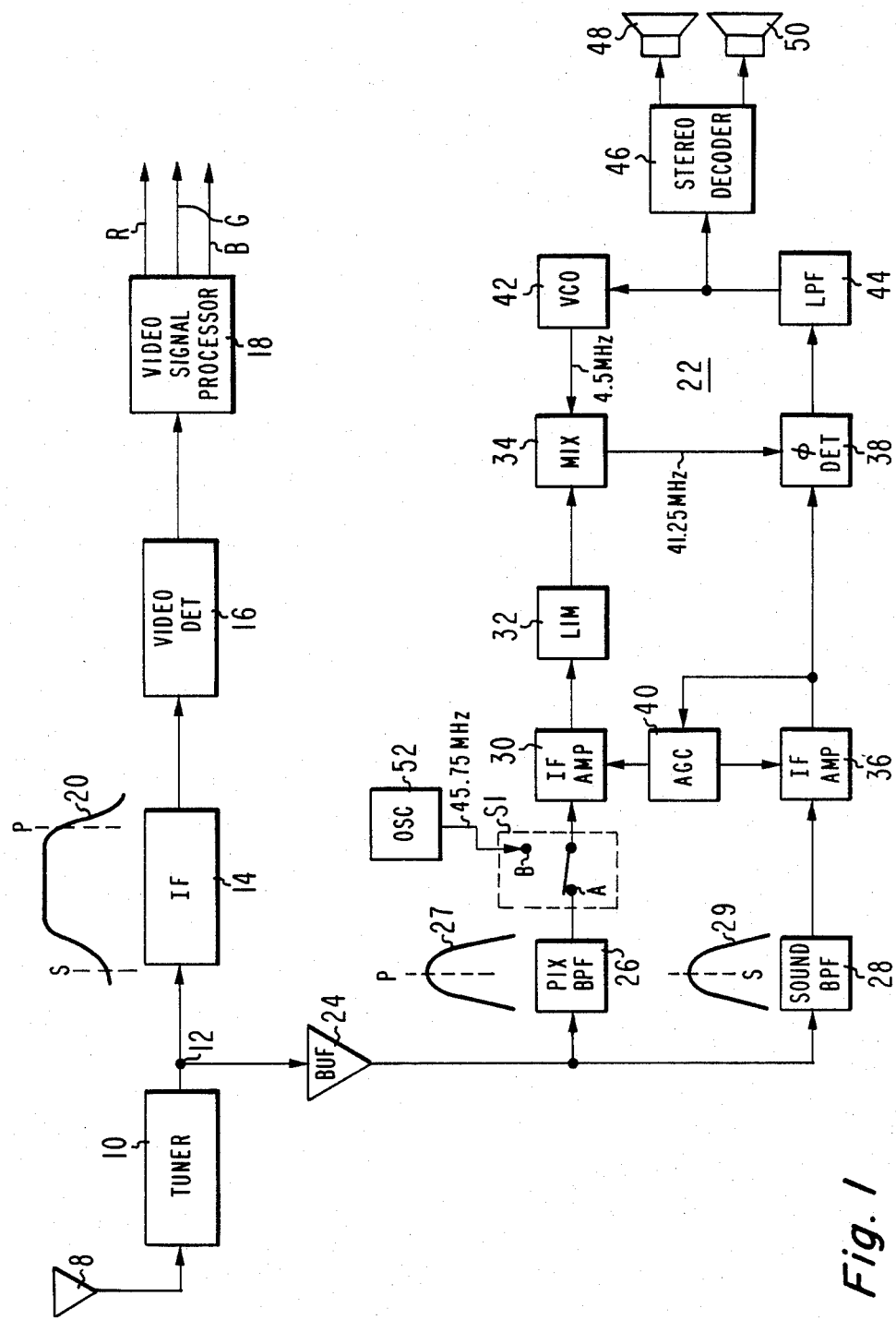
FIG. 1 shows in block diagram form a television receiver including a frequency translation PLL sound detection system constructed in accordance with the principles of the invention.

Referring to FIG. 1, a television boradcast signal received by an antenna 8 is applied to a television turner 10. Turner 10 selectively translates the RF picture and sound carrier signals of a selected TV channel to intermediate frequency (IF) carriers at, e.g., 45.75 MHz and 41.25 MHz, respectively, in the NTSC system. The IF carriers are available at tuner output terminal 12. The IF picture carrier is basically an amplitude modulated (AM) signal containing the composite video information. The IF sound carrier, on the other hand, is a frequency modulated (FM) signal. Conventional color television signal processing circuitry including an IF filtering and amplifying channel 14, a video detector 16 and a video signal processor 18 are responsive to the IF picture carrier at terminal 12 for providing red (R), green (G) and blue (B) color video signals to a kinescope (not shown) for reproducing a color image of a televised scene.

IF channel 14 has a conventional passband response 20 in which the IF picture carrier P is located 6 dB down on the higher frequency slope of passband response 20 and the IF sound carrier S is located approximately 25 dB down on the lower frequency slope of passband response 20 so that the vestigial sideband video information can be detected without significant interference from the IF sound carrier. Unfortunately, IF passband response 20 induces what is called a "Nyquist" incidential carrier phase modulation (ICPM) to. the IF picture carrier, due to its asymmetrical attenuation of the sidebands of the IF picture carrier. In the conventional intercarrier sound detection system wherein the IF picture and sound carriers are mixed to produce an intercarrier sound signal, this Nyquist induced ICPM distortion of the IF picture carrier results in distortion of the intercarrier sound signal. Furthermore, ICPM distortion of the picture carrier can occur at the television transmitter. There, changes in the video and RF signal levels can result in changes in circuit parameters of the various parts of the transmitter and impart varying amounts of ICPM to the picture carrier. Since this ICPM is imparted to the picture carrier only, mixing of the picture and sound carriers in the intercarrier type of detector also results in distortion of the intercarrier sound signal. These distortions of the intercarrier sound signal distort the FM audio information and result in audio buzz. The amount of audio buzz caused by ICPM increases in direct relationship with increases in the bandwidth of the audio signal. Thus, when one considers that the bandwidth of a composite audio signal including, for example, multiple subcarriers for the tranmission of monophonic, stereophonic and additional audio program signals, would be significantly greater than the bandwidth of the monophonic signal conventionally processed by an intercarrier system, it becomes apparent that an intercarrier method of audio detection is likely to be unsatisfactory since the audio buzz produced will be substantially increased.

In accordance with the present invention the IF sound carrier is processed in a path separate from the IF picture carrier processing circuitry and the composite audio signal is detected by a frequency translation phase-locked loop (PLL) arrangement 22 which can be switched to operate as an intercarrier or separate type of audio detector. Specifically, a buffer amplifier 24 couples the IF picture and sound carriers from terminal 12 to picture and sound bandpass filters 26 and 28, respectively. Picture bandpass filter 26 has a symmetrical, relatively narrow (e.g., a 3 dB bandwidth of 1 MHz) passband response 27 centered at the IF picture carrier frequency (e.g., 45.75 MHz in the NTSC system) for selecting substantially only the IF picture carrier signal. A single throw, double pole switch S1 having contact terminals A and B is coupled to the output of bandpass filter 26. When switch S1 is in the A position it applies the IF picture carrier signal from bandpass filter 26 to an IF amplifier 30 and a limiter 32, coupled in cascade, for appropriately amplifying and limiting the IF picture carrier signal. The resultant limited, and therefore substantially unmodulated, IF picture carrier is coupled to one input of a signal mixer 34.

A sound bandpass filter 28 is also coupled to the output of buffer 24. Sound bandpass filter 28 has a symmetrical, relatively narrow (e.g., a 3 dB bandwidth of 1 MHz) passband 29 centered at the IF sound carrier frequency S (e.g., 41.25 MHz in the NTSC system) for passing substantially only the IF sound carrier signal and its immediate sidebands which are applied, after amplification by an IF amplifier 26, as one input to a phase detector 38. IF amplifiers 30 and 26 may be similarly configured and each comprise, for example, an integrated circuit IF amplifier such as the TA 7607 manufactured by Tokyo Shibaura Electric Co., Ltd. Limiter 32 may simply comprise parallel connected, oppositely poled Schottky-barrier diodes. A conventional automatic gain control circuit (AGC) 40 is responsive to the output of IF amplifier 36 (or alternatively to the output of amplifier 30) for supplying AGC control voltages to IF amplifiers 30 and 36 for controlling their gain so as to establish their output signals at predetermined levels.

A varactor tuned voltage controlled oscillator (VCO) 42 having a nominal oscillation frequency equal to the frequency difference (e.g., 4.5 MHz for the NTSC system) between the IF picture and sound carriers provides a second input to mixer 34. Mixer 34 may comprise, for example, a double balanced analog multiplier circuit, such as the MC1496 available from Motorola Semiconductor Products, Inc., which operates in a switching mode in response to the amplitude limited IF picture carrier (which acts as the switching control signal) for mixing the IF picture carrier signal and the VCO output signal to provide at its output a frequency translated signal representing the frequency and phase differences between its input signals. In the NTSC system, the frequency difference between the input signals of mixer 34 is 41.25 MHz. The 41.25 MHz output signal of mixer 34 is supplied as a second input to phase detector 38, which can also comprise an MC1496 integrated circuit. Phase detector 38 provides an output signal having an amplitude which varies in direct relation with the phase difference of its input signals and thus operates as a frequency modulation (FM) demodulator for the FM modulated IF sound signal coupled to its first input from amplifier 36 and provides at its output a composite baseband audio signal (along with undesired signals which result from the detection process). For a more detailed discussion of the operation of analog multipliers as FM demodulators see an article entitled "Applications of a Monolithic Analog Multiplier" by A. Bilotti, in *IEEE Journal of Solid State Circuits*, Dec. 1968, pages 373–380.

A lowpass filter 44 coupled to the output of phase detector 38 filters its output signal to provide a control signal for controlling the frequency of VCO 42. Mixer 34, phase detector 38, VCO 42 and lowpass filter 44 comprise the frequency translation phase-locked loop 22. Lowpass filter 44 has a sufficient bandwidth for selecting the composite baseband audio signal but narrow enough for rejecting the higher frequency undesired signals and supplies the composite audio information signal, for example, to a stereo decoder 46. If stereo programming is provided in the composite audio signal, decoder 46 will decode the composite audio signal and provide left and right stereo signals to speakers 48 and 50, respectively. If stereo programming is not provided, decoder 46 will provide the monophonic signal to the speakers.

A fixed frequency oscillator 52 has an oscillation frequency equal to the frequency of the IF picture carrier (e.g., 45.75 MHz in the NTSC system) and provides an output signal to contact terminal B of switch S1 for the reasons discussed below.

In operation, when switch S1 is in position A, mixer 34 mixes the IF picture carrier signal and the output signal of VCO 42 applied to its inputs and provides an output signal having a frequency corresponding to the difference of the frequencies of its input signals (e.g., 41.25 MHz). Phase detector 38 provides an output signal representative of the phase and frequency differences of the 41.25 MHz output signal of mixer 34 and the IF sound carrier provided by IF amplifier 36. Any undesired components of the output signal of phase detector 38, such as, corresponding to feedthrough of the input signals of mixer 34 and the frequency sum of the input signals of mixer 34, are attenuated by the relatively narrow bandwidth of lowpass filter 44. The output voltage of lowpass filter 44 is applied as a control volage to VCO 42. The frequency of the output signal of VCO 42, and consequently the 41.25 MHz frequency translated signal from mixer 34, changes in direct relation to the amplitude of the control voltage and is in a direction for reducing the phase difference between the signals at the inputs of phase detector 38. When the phase of the input signals of detector 38 are in quadrature (90°), a minimum amplitude control voltage is applied to VCO 42. Therefore, due to the feedback nature of loop 22, when it is locked, the control voltage at the output of filter 44 is such that the frequency of the translated difference signal at the output of mixer 34 is equal to the average frequency of the IF sound carrier and its phase is in quadrature in relation to the phase of the IF sound carrier. Thus, phase detector 38 acts as an FM detector for frequency demodulating the IF sound carrier to produce a signal which, when filtered by filter 44, corresponds to the audio information.

Since mixer 34 is responsive to the IF picture carrier signal, as previously noted, PLL 22 can be referred to as an intercarrier type of detector. Any common mode FM which may be imparted to both the picture and sound carriers by, e.g., the local oscillator of tuner 10 or television accessories such as a cable television converter which may precede tuner 10, is transferred by mixer 34 to the frequency translated signal and therefore cancelled in phase detector 38.

When switch S1 is in position B, the received IF picture carrier provided by bandpass filter 26 is not applied to amplifier 30 and instead the output signal of oscillator 52 is used to supply one of the inputs for mixer 34. Mixer 34 still generates a frequency translated signal having a frequency equal to the IF sound carrier frequency and the remainder of PLL 22 operates as before except however, that since the output signal of oscillator 52 is not a received signal, PLL 22 detects the audio information in a manner similar to the "separate" type of audio detector. Thus, under conditions when only the IF picture carrier includes ICPM distortion, switch S1 can be switched to the B position in order to avoid contamination of the audio information which would occur if an intercarrier type of detection method was used.

It may be desirable to not operate oscillator 52 at the output frequency of 45.75 MHz in order to reduce possible interference of the video information. In this case, the output frequency of oscillator 52 can be changed to 36.75 MHz (in the NTSC system) since the sum signal at the output of mixer 34 would still have the same frequency as the IF sound carrier.

Figure 2:
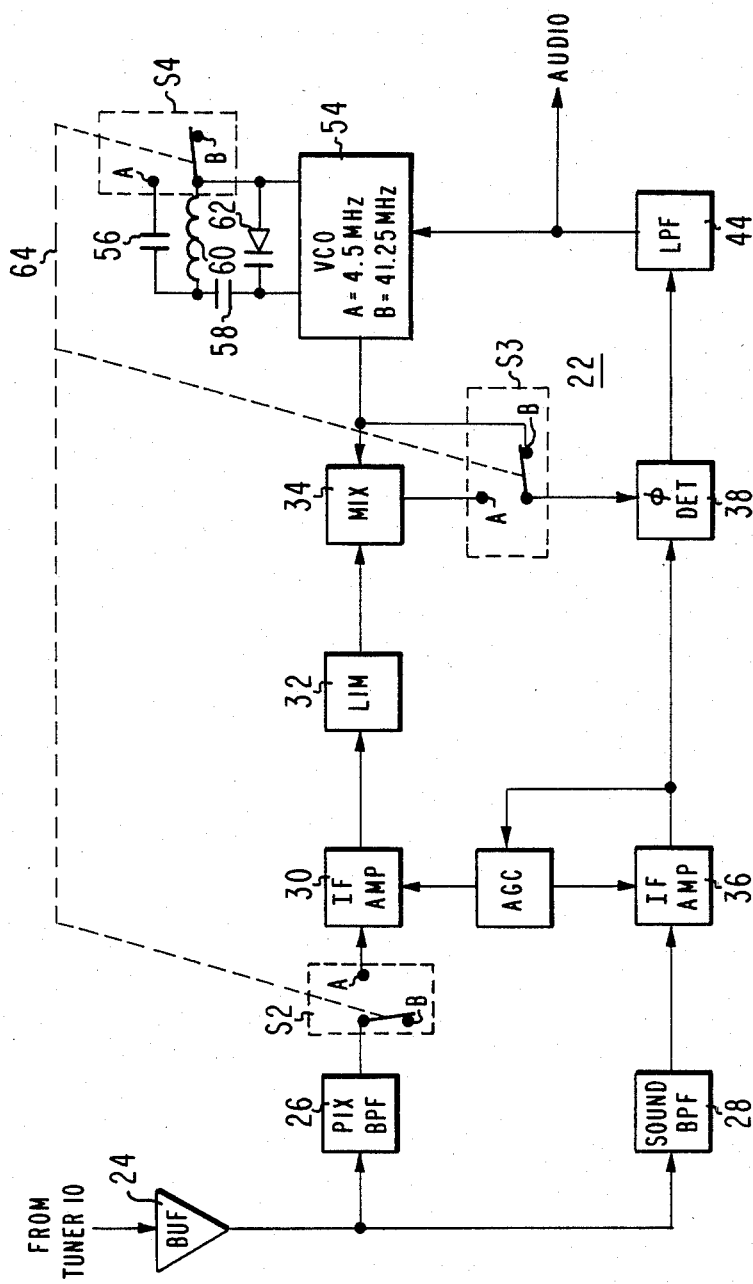
FIG. 2 shows in block diagram form an alternative embodiment of a frequency translation PLL sound detection system for the television receiver of FIG. 1, also constructed in accordance with the principles of the invention.

In FIG. 2, an alternative embodiment of the sound detection system of the television receiver of FIG. 1 is shown. Elements having the same construction and operation have reference numbers similar to the corresponding elements of FIG. 1. The sound detection system of FIG. 2 includes switches S2, S3, and S4 for changing the sound detection system from an intercarrier type to a separate type. Switch S2 has an A position for applying the IF picture carrier signal from the output of filter 26 to the input of IF amplifier 30. Switch S3 includes an A position for applying the output signal from mixer 34 to an input of phase detector 38. A VCO 54, corresponding in part to VCO 52 of the structure of FIG. 1 during the intercarrier mode of operation, includes a switch S5 which, when in position A, couples a capacitor 56 to the tuned circuit arrangement of capacitor 58, inductor 60 and variable capacitance ("varactor") diode 62 of VCO 54 to establish the output frequency of VCO 54 at 4.5 MHz. The position of switches S2, S3 and S4 are simultaneously controlled as indicated by dashed line 64, and when they are in position A, PLL 22 operates as an intercarrier type detector in the same manner as previously described with respect to FIG. 1. In position B, however, switch S2 uncouples the IF picture carrier from amplifier 30, switch S3 couples the output of VCO 54 to the input of phase detector 38 and switch S4 electrically uncouples capacitor 56 from the tuned circuit arrangement of VCO 54. When capacitor 56 is not electrically connected, the output frequency of VCO 54 is the nominal frequency of the IF sound carrier, 41.25 MHz. Thus, PLL 22 operates as a "separate" type detector and detects the audio information without using the received picture carrier.

The operation of switch S1 of FIG. 1 or switches S2, S3 and S4 of FIG. 2 can be controlled by the user in response to a subjective determination by the user of the severity of the audio buzz. Alternatively, the operation of the switches can be changed automatically, for example, to position A in response to the selection of certain channels (e.g., 3 or 4 in the U.S.) by the channel selection portion of tuner 10 used for receiving RF signals from a television accessory such as a cable TV converter or, to position B in response to the selection of UHF channels. Since the UHF broadcast frequencies are higher than the VHF broadcast frequencies, UHF transmitters are more susceptible to picture carrier ICPM and consequently the TV receiver should be capable of providing "separate" type of sound detection for UHF stations.

While separate IF amplifiers 30 and 36 are used in the embodiments shown in the FIGURES, a common IF amplifier can be used for amplifying the IF picture and sound carrier signals provided at the output of buffer 24, such as described in copending U.S. Patent Application Ser. No. 412,902, entitled "FREQUENCY TRANSLATION PHASE-LOCKED LOOP SOUND DETECTION SYSTEM UTILIZING A SINGLE IF AMPLIFIER" filed Aug. 30, 1982 in the name of P. D. Griffis and assigned, like the present application, to RCA Corporation. Finally, it should be clear that the NTSC frequencies mentioned herein are merely illustrative and can be appropriately scaled for operation at other frequencies in the NTSC, PAL or SECAM television systems.

What is claimed is:
1. In a television system including a source of an intermediate frequency (IF) signal having an IF picture carrier amplitude modulated with video information and an associated IF sound carrier frequency modulated with audio information, apparatus for detecting said audio information comprising:

a frequency translation phase-locked loop (PLL) for producing at an output said audio information, said frequency translation PLL including a phase detector having a first input coupled to be responsive to said frequency modulated sound carrier, a second input and an output for providing said audio information;

an oscillator for producing an oscillator signal; and a switching means coupled to be responsive to said amplitude modulated picture carrier and said oscillator signal for selectively causing said second input of said phase detector to be responsive to either said amplitude modulated picture carrier or said oscillator signal.

2. In a television system including a source of an intermediate frequency (IF) signal having an IF picture carrier amplitude modulated with video information and an associated IF sound carrier frequency modulated with audio information, apparatus for detecting said audio information comprising:

a frequency translation phase-locked loop (PLL) for producing at an output said audio information, said frequency translation PLL including a phase detector having a first input coupled to be responsive to said frequency modulated sound carrier, a second input and an output; a low pass filter having an input coupled to said output of said phase detector and an output, said output of said low pass filter being coupled to said output at which said audio information is provided; a frequency controlled oscillator having an input coupled to said output of said low pass filter and an output; and a mixer having a first input coupled to the output of said controlled oscillator, a second input coupled to receive said amplitude modulated picture carrier, and an output coupled to said second input of said phase detector;

a second oscillator for providing a second oscillator signal;

switching means coupled to be responsive to said amplitude modulated picture carrier and said second oscillator signal and for selectively rendering said second input of said phase detector to be responsive to either said amplitude modulated picture carrier or said second oscillator signal.

3. The apparatus recited in claim 2 wherein:
said second oscillator provides said second oscillator signal at a fixed frequency equal to the nominal frequency of said amplitude modulated picture carrier; and said switching means includes a switch for selectively coupling either said amplitude modulated picture carrier or said second oscillator signal to said second input of said mixer.

4. In a television system including a source of an intermediate frequency (IF) signal having an IF picture carrier amplitude modulated with video information and an associated IF sound carrier frequency modulated with audio information, apparatus for detecting said audio information comprising:

a frequency translation phase-locked loop (PLL) for producing at an output said audio information, said frequency translation PLL including a phase detector having a first input coupled to be responsive to said frequency modulated sound carrier, a second input and an output; a low pass filter having an input coupled to said output of said phase detector and an output, said output of said low pass filter being coupled to said output at which said information is provided; a frequency controlled oscillator having an input coupled to said output of said low pass filter and an output; and a mixer having a first input coupled to the output of said controlled oscillator, a second input coupled to receive said amplitude modulated picture carrier, and an output coupled to said second input of said phase detector;

frequency determining means coupled to said frequency controlled oscillator for determining a nominal frequency of oscillation for said oscillator; and switching means including a first switch for selectively coupling either said output of said mixer or said output of said frequency controlled oscillator to said second input of said phase detector, and a second switch coupled to said frequency determining means and concurrently actuated with said first switch means for causing said nominal frequency of said frequency controlled oscillator to be substantially equal to the difference between the frequencies of said amplitude modulated picture carrier and the nominal frequency of said frequency modulated sound carrier when said first switch couples said output of said mixer to said second input of said phase detector and for causing said nominal frequency of said frequency controlled oscillator to be substantially equal to the nominal frequency of sid frequency modulated sound carrier when said first switch couples the output of said frequency controlled oscillator to said second input of said phase detector.

5. The apparatus recited in claim 4 wherein:

said switching means includes a third switch for selectively coupling said amplitude modulated picture carrier to said second input of said mixer when said first switch couples the output of said mixer to said second input of said phase detector and for decoupling said amplitude modulated picture carrier from said second input of said mixer when said first switch couples the output of said controlled oscillator to said second input of said phase detector.

* * * * *